United States Patent
Park et al.

(10) Patent No.: US 11,029,912 B2
(45) Date of Patent: Jun. 8, 2021

(54) DISPLAY APPARATUS DIVIDING THE DISPLAY INTO A PLURALITY OF REGIONS AND UNIFORM LIGHT CONTROL METHOD THEREOF

(71) Applicant: SAMSUNG ELECTRONICS CO., LTD., Suwon-si (KR)

(72) Inventors: Ji Yong Park, Suwon-si (KR); Young-Hoon Cho, Suwon-si (KR); Sang Kyun Im, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/715,724

(22) Filed: Dec. 16, 2019

(65) Prior Publication Data
US 2020/0193897 A1 Jun. 18, 2020

(30) Foreign Application Priority Data

Dec. 17, 2018 (KR) .................. 10-2018-0163277

(51) Int. Cl.
*G06F 3/14* (2006.01)
*G09G 3/32* (2016.01)
(Continued)

(52) U.S. Cl.
CPC ......... *G06F 3/1446* (2013.01); *G09G 3/2007* (2013.01); *G09G 3/32* (2013.01);
(Continued)

(58) Field of Classification Search
CPC .. G06F 3/1446; G09G 2300/026; G09G 5/14; G09G 2360/145; G09G 3/32;
(Continued)

(56) References Cited

U.S. PATENT DOCUMENTS 5,396,257 A 3/1995 Someya et al.
6,414,661 B1 * 7/2002 Shen .................... G09G 3/3208
345/46

(Continued)

FOREIGN PATENT DOCUMENTS

KR 10-2015-0054452 A 5/2015
WO WO-2017022942 A1 * 2/2017 ........... G09G 3/3426

OTHER PUBLICATIONS

International Search Report (PCT/ISA/210) dated Apr. 10, 2020 issued by the International Searching Authority in counterpart International Application No. PCT/KR2019/017633.

*Primary Examiner* — Darlene M Ritchie
(74) *Attorney, Agent, or Firm* — Sughrue Mion, PLLC

(57) ABSTRACT

Provided a display apparatus including a display including a plurality of display modules, each display module of the plurality of display modules including a pixel driving circuit and at least one pixel including a red inorganic light emitting element, a green inorganic light emitting element, and a blue inorganic light emitting element, a signal receiver configured to receive an image signal having a plurality of grayscales, and a controller configured to divide the display into a plurality of regions, each region of the plurality of regions having a same area and including at least one display module (Continued)

among the plurality of display modules, calibrate the image signal to output uniform light from each of the plurality of regions, and control the pixel driving circuit to display an image based on the calibrated image signal.

16 Claims, 10 Drawing Sheets

(51) Int. Cl.
    *G09G 3/20*     (2006.01)
    *G09G 5/14*     (2006.01)

(52) U.S. Cl.
    CPC ......... *G09G 5/14* (2013.01); *G09G 2300/026* (2013.01); *G09G 2320/0233* (2013.01); *G09G 2320/0271* (2013.01); *G09G 2320/0276* (2013.01); *G09G 2320/0673* (2013.01); *G09G 2320/0693* (2013.01); *G09G 2354/00* (2013.01); *G09G 2360/145* (2013.01)

(58) Field of Classification Search
    CPC ......... G09G 3/2007; G09G 2320/0276; G09G 2320/0693; G09G 2320/0233; G09G 2320/0271; G09G 2320/0673; G09G 2354/00

See application file for complete search history.

(56) References Cited

U.S. PATENT DOCUMENTS

| | | | | |
|---|---|---|---|---|
| 10,311,776 | B2* | 6/2019 | Park | G09G 3/3208 |
| 2005/0134525 | A1 | 6/2005 | Tanghe et al. | |
| 2011/0095965 | A1* | 4/2011 | Yon Eoka | G06F 3/1446 |
| | | | | 345/1.1 |
| 2012/0038660 | A1* | 2/2012 | Han | G09G 3/2003 |
| | | | | 345/590 |
| 2014/0240201 | A1* | 8/2014 | Takahashi | G09G 5/10 |
| | | | | 345/1.3 |
| 2015/0138222 | A1* | 5/2015 | Imaizumi | G03B 21/00 |
| | | | | 345/589 |
| 2015/0243251 | A1 | 8/2015 | Ohnishi | |
| 2016/0260400 | A1* | 9/2016 | Yamazaki | G09G 3/3648 |
| 2017/0208655 | A1* | 7/2017 | Lee | H05B 45/00 |
| 2017/0323619 | A1* | 11/2017 | Lee | G09G 5/10 |
| 2017/0352310 | A1* | 12/2017 | Kim | G09G 3/32 |
| 2018/0033395 | A1* | 2/2018 | Masuyama | G06F 3/1446 |
| 2018/0225075 | A1* | 8/2018 | Park | G09G 3/3233 |
| 2018/0295312 | A1 | 10/2018 | Cho et al. | |

\* cited by examiner

DISPLAY APPARATUS DIVIDING THE DISPLAY INTO A PLURALITY OF REGIONS AND UNIFORM LIGHT CONTROL METHOD THEREOF

CROSS-REFERENCE TO RELATED APPLICATION

This application is based on and claims priority under 35 U.S.C. § 119 to Korean Patent Application No. 10-2018-0163277, filed on Dec. 17, 2018, in the Korean Intellectual Property Office, the disclosure of which is incorporated by reference herein in its entirety.

BACKGROUND

1. Field

The disclosure relates to a display apparatus for calibrating uniformity between pixels with respect to a full gray scale, and a control method thereof.

2. Description of Related Art

A display apparatus includes a display panel for displaying an image and is capable of displaying broadcast signals or image signals/image data of various formats. The display apparatus may be implemented as a television (TV) or a monitor.

When the display apparatus includes a display panel composed of light-emitting diode (LED) elements, luminance and chromaticity of pixels corresponding to each element may be different according to the electrical, physical, or optical characteristics of each element in the same gray scale.

That is, in the display apparatus, the light output of each pixel may not be uniform with each other, thereby causing issues such as screen blurring.

SUMMARY

Provided is a display apparatus capable of allowing light output between pixels to be more uniform by calibrating the uniformity between the pixels constituting a display panel a plurality of times by varying a division size for dividing the display panel, and a control method thereof.

Additional aspects will be set forth in part in the description which follows and, in part, will be apparent from the description, or may be learned by practice of the presented embodiments.

In accordance with an aspect of an embodiment, there is provided a display apparatus including a display including a plurality of display modules, each display module of the plurality of display modules including a pixel driving circuit and at least one pixel including a red inorganic light emitting element, a green inorganic light emitting element, and a blue inorganic light emitting element, a signal receiver configured to receive an image signal having a plurality of grayscales, and a controller configured to divide the display into a plurality of regions, each region of the plurality of regions having a same area and including at least one display module among the plurality of display modules, calibrate the image signal to output uniform light from each of the plurality of regions, and control the pixel driving circuit to display an image based on the calibrated image signal.

The controller may be further configured to determine a calibration coefficient for each grayscale corresponding to each of the plurality of display modules based on a reference calibration coefficient corresponding to each of the plurality of display modules, and calibrate the image signal by applying the determined calibration coefficient to the image signal based on each of the plurality of display modules.

The reference calibration coefficient corresponding to one of the plurality of display modules may include a reference calibration coefficient corresponding to each of a plurality of regions having an area corresponding to a display module among the plurality of display modules.

The controller may be further configured to divide the display region of the display into a plurality of first regions based on an area corresponding to one of the plurality of display modules, determine a first calibration coefficient corresponding to each of the plurality of first regions based on a first reference calibration coefficient and a grayscale of each of the plurality of first regions, and calibrate the image signal by applying the determined first calibration coefficient to the image signal.

The controller may be further configured to divide the display region of the display into a plurality of second regions based on an area corresponding to another display module of the plurality of display modules, determine a second calibration coefficient corresponding to each of the plurality of second regions based on a second reference calibration coefficient and a grayscale corresponding to each of the plurality of second regions, and calibrate the image signal by applying the determined second calibration coefficient to an image signal to which the determined first calibration coefficient is applied.

The reference calibration coefficient may include a plurality of measurement calibration coefficients obtained based on a measurement of an image displayed on the display for a plurality of reference grayscales among the plurality of grayscales, wherein the reference grayscale may include at least one first grayscale selected from grayscales lower than a first value and at least one second grayscale selected from grayscales higher than a second value.

The controller may be further configured to determine a reference calibration coefficient corresponding to each of the plurality of display modules based on measurement of an image displayed in the plurality of regions of the display divided to have an area corresponding to one of the plurality of display modules.

The controller may be further configured to determine a reference calibration coefficient corresponding to the reference grayscale as the determined calibration coefficient for a grayscale section set by a user based on the reference grayscale, and determine the determined calibration coefficient based on the reference calibration coefficient corresponding to the reference grayscale having a lowest grayscale included in a grayscale section equal to or lower than the reference grayscale having the lowest grayscale.

The controller may be further configured to determine the determined calibration coefficient based on reference calibration coefficient corresponding to the reference grayscale having the highest grayscale included in a grayscale section equal to or higher than the reference grayscale having the highest grayscale and determine the determined calibration coefficient based on the reference calibration coefficient corresponding to each of the reference grayscales having grayscale sections therebetween for the grayscale section between the reference grayscales.

The controller may be further configured to replace a display module among the plurality of display modules, identify a display module corresponding to the replaced display module among the plurality of display, and calibrate a gamma value of the replaced display module based on a gamma calibration table corresponding to the identified display module or apply the determined calibration coefficient to an image signal corresponding to the replaced display module.

In accordance with another aspect of an embodiment, there is provided a control method of a display apparatus including a display that includes a plurality of display modules, each display module of the plurality of display modules including a pixel driving circuit and at least one pixel including a red inorganic light emitting element, a green inorganic light emitting element, and a blue inorganic light emitting element, the control method including receiving an image signal having a plurality of grayscales, dividing a display region of the display into a plurality of regions, each region of the plurality of regions having a same area and including at least one display module among the plurality of display modules, calibrating the image signal to output uniform light from each of the plurality of regions, and controlling the pixel driving circuit to display an image based on the calibrated image signal.

The calibrating the image signal may include determining a calibration coefficient for each grayscale corresponding to each of the plurality of display modules based on a reference calibration coefficient corresponding to each of the plurality of display modules, and calibrating the image signal by applying the determined calibration coefficient to the image signal based on each of the plurality of display modules.

The reference calibration coefficient corresponding to one of the plurality of display modules may include a reference calibration coefficient corresponding to each of a plurality of regions of the display divided into an area corresponding to a display module among the plurality of display modules.

The calibrating the image signal may include dividing the display region of the display into a plurality of first regions based on an area corresponding to one of the plurality of display modules, determining a first calibration coefficient corresponding to each of the plurality of first regions based on a first reference calibration coefficient and a grayscale corresponding to each of the plurality of first regions, and calibrating the image signal by applying the determined first calibration coefficient to the image signal.

The calibrating the image signal may include dividing the display region of the display into a plurality of second regions based on an area corresponding to another display module of the plurality of display modules, determining a second calibration coefficient corresponding to each of the plurality of second regions based on a second reference calibration coefficient and a grayscale corresponding to each of the plurality of second regions, and calibrating the image signal by applying the determined second calibration coefficient to an image signal to which the determined first calibration coefficient is applied.

The reference calibration coefficient may include a plurality of measurement calibration coefficients obtained based on a measurement of an image displayed on the display for a plurality of reference grayscales among the plurality of grayscales, wherein the reference grayscale may include at least one first grayscale selected from grayscales lower than a first value and at least one second grayscale selected from grayscales higher than a second value.

The control method may further include determining a reference calibration coefficient corresponding to each of the plurality of display modules based on measurement of an image displayed in the plurality of regions of the display divided into an area corresponding to one of the plurality of display modules.

The determining a calibration coefficient for each grayscale may include determining a reference calibration coefficient corresponding to the reference grayscale as the determined calibration coefficient for a grayscale section set by a user based on the reference grayscale, and determining the determined calibration coefficient based on the reference calibration coefficient corresponding to the reference grayscale having a lowest grayscale included in a first grayscale section equal to or lower than the reference grayscale having the lowest grayscale.

The determining a calibration coefficient for each grayscale may include determining the determined calibration coefficient based on reference calibration coefficient corresponding to the reference grayscale having a highest grayscale included in a second grayscale section equal to or higher than the reference grayscale having the highest grayscale, and determining the determined calibration coefficient based on the reference calibration coefficient corresponding to each of the reference grayscales having grayscale sections therebetween for the grayscale section between the reference grayscales.

The control method may further include replacing a display module among the plurality of display modules, identifying a display module corresponding to the replaced display module among the plurality of display modules, and calibrating a gamma value of the replaced display module based on a gamma calibration table corresponding to the identified display module or applying the determined calibration coefficient to an image signal corresponding to the replaced display module.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
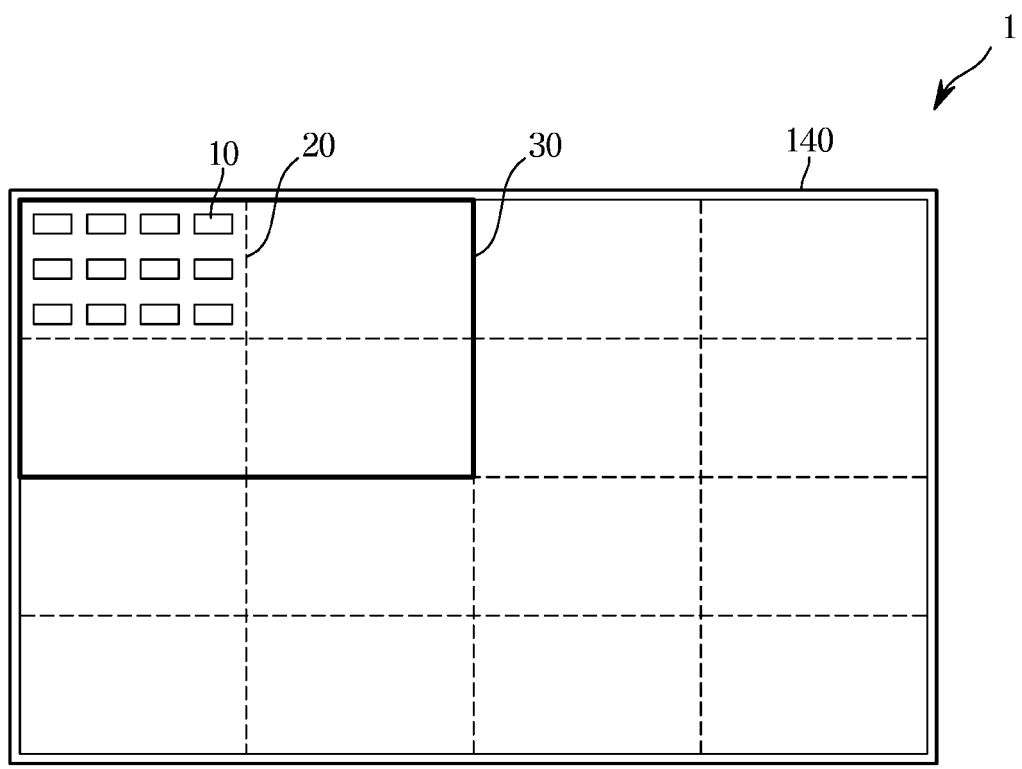
FIG. 1 illustrates a display apparatus according to an embodiment.

Embodiments described in the disclosure and configurations shown in the drawings are merely examples of the embodiments of the disclosure, and may be modified in various different ways.

It will be understood that when an element is referred to as being "connected" another element, it can be directly or indirectly connected to the other element, wherein the indirect connection includes "connection via a wireless communication network".

Also, the terms used herein are used to describe the embodiments and are not intended to limit and/or restrict the disclosure. The singular forms "a," "an" and "the" are intended to include the plural forms as well, unless the context clearly indicates otherwise. In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, but elements are not limited by these terms. These terms are only used to distinguish one element from another element. For example, without departing from the scope of the present disclosure, a first element may be termed as a second element, and a second element may be termed as a first element. The term of "and/or" includes a plurality of combinations of relevant items or any one item between a plurality of relevant items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

In the following description, terms such as "unit", "part", "block", "member", and "module" indicate a unit for processing at least one function or operation. For example, those terms may refer to at least one process processed by at least one hardware such as Field Programmable Gate Array (FPGA), Application Specific Integrated Circuit (ASIC), at least one software stored in a memory or a processor.

An identification code is used for the convenience of the description but is not intended to illustrate the order of each step. The each step may be implemented in the order different from the illustrated order unless the context clearly indicates otherwise.

Reference will now be made in detail to embodiments of the disclosure, examples of which are illustrated in the accompanying drawings.

Figure 2:
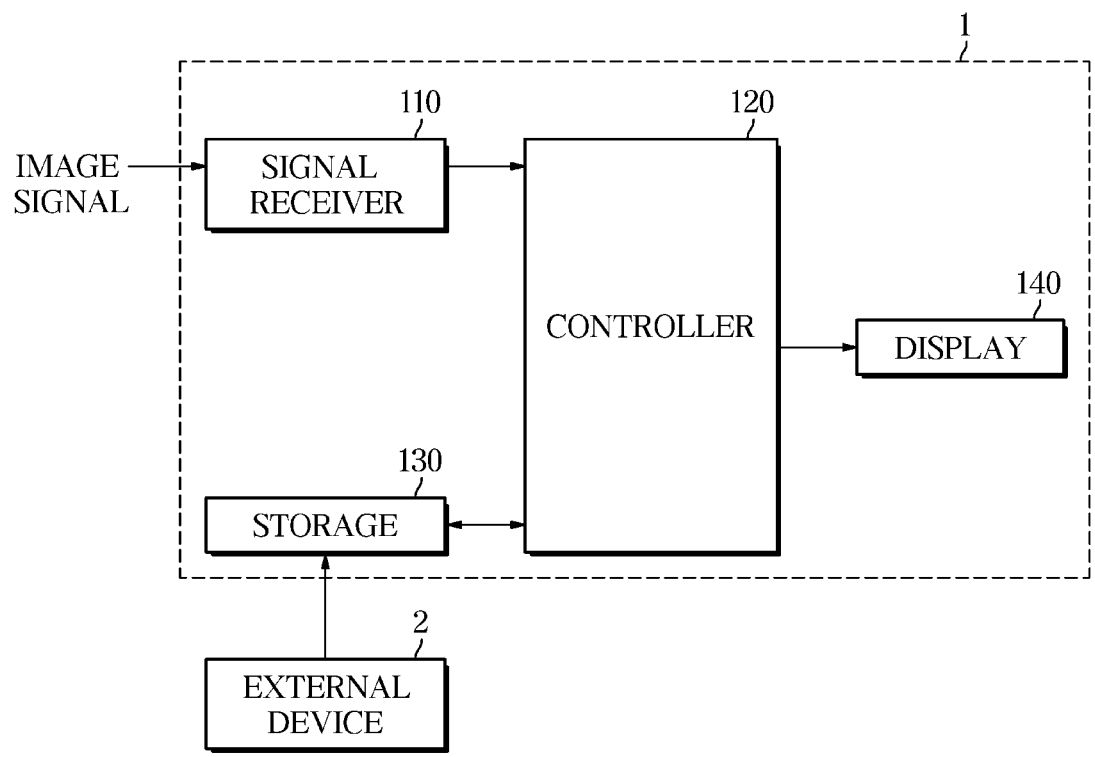
FIG. 2 is a block diagram of the display apparatus according to an embodiment.

FIG. 1 illustrates a display apparatus according to an embodiment of the disclosure. FIG. 2 is a block diagram of the display apparatus according to an embodiment of the disclosure.

Referring to FIG. 1, a display apparatus 1 according to an embodiment may include a display 140. The display 140 may correspond to a display panel on which an image is displayed.

The display apparatus 1 may receive an image signal from the outside and control the display 140 to display an image based on the image signal. In this case, the display apparatus 1 may display an image composed of a plurality of pixels by controlling the light output of the pixels constituting the display 140 based on the image signal.

As described above, the display 140 of the display apparatus 1 may be configured of a plurality of light emitting diode (LED) elements 10 forming pixels in order to display an image.

One pixel of the image may be displayed by at least one or more LED elements 10, and one LED element 10 may display a plurality of pixels. That is, the plurality of LED elements 10 is provided to correspond to the plurality of pixels. For example, the number of the plurality of LED elements 10 may be equal to the number of the plurality of pixels to correspond to the plurality of pixels, respectively, but embodiments are not limited thereto. For example, the number of the plurality of LED elements 10 may be less than the number of the plurality of pixels so that two or more pixels are allocated to one LED element 10. Hereinafter in the embodiment, it will be described that each of the plurality of LED elements 10 included in the display 140 corresponds to one pixel. In addition, one LED element 10 will be described as including a red (R) inorganic light emitting element, a green (G) inorganic light emitting element and a blue (B) inorganic light emitting element. That is, one pixel includes sub-pixels of R, G, and B, and the display 140 may include a plurality of pixels including sub-pixels of R, G, and B, respectively.

In addition, a display region of the display 140 may be divided into a display module 20 composed of the plurality of LED elements 10. The display 140 may be divided into division sizes corresponding to the display module 20 including the plurality of pixels, which may improve the uniformity between the display modules 20 not matching despite the uniformity calibration between the LED elements 10. The display apparatus 1 according to an embodiment may calibrate the uniformity between the divided display modules 20. The description of the calibration of the uniformity will be described later in detail.

In this case, although the display module 20 is shown as being composed of twelve LED elements 10 in FIG. 1, embodiments are not limited thereto.

In detail, the display 140 may be divided into a preset division size, and each of the divided regions may correspond to one display module 20.

The preset division size may correspond to the LED element 10 of the M×N matrix. That is, the preset division size may correspond to the size of the LED element 10 of the matrix having M LED elements 10 in rows and N LED elements 10 in columns.

In this case, the preset division size may correspond to each of the display module 20 having various sizes in which M corresponding to the number of LED elements 10 in a row in a matrix and N corresponding to the number of LED elements 10 in a column in a matrix are set differently.

That is, the display 140 may include at least one pixel and a pixel driving circuit, and may include a plurality of display modules having different areas, where the number of LED elements included in the display module, that is, the number of pixels, is different.

In addition, the display region of the display 140 may be divided to have the same area based on an area corresponding to any one of the plurality of display modules. The display apparatus 1 may calibrate an image signal corresponding to each region so that each region divided into the same area has a uniform light output. The calibration of the image signal will be described later in detail.

In addition, the pixel composed of the LED element 10 is disposed in front of the display module 20 to form a display region of the display 140. In addition, the pixel driving circuit may be disposed on the rear surface of the display module 20 to transmit a control signal corresponding to the image signal to the pixels to drive each pixel.

In addition, the display region of the display 140 may be divided into an LED cabinet 30 composed of at least one display module 20. This is to improve the uniformity between the LED cabinets 30 not matching despite the uniformity calibration between the display modules 20. The display apparatus 1 according to an embodiment may calibrate the uniformity between the divided LED cabinets 30. The description of the uniformity calibration will be described later.

In FIG. 1, the LED cabinet 30 includes four display modules 20, but embodiments are not limited thereto. In addition, one LED cabinet 30 may correspond to one display module 20 having different areas.

For example, the display region of the display 140 may be divided to have the same area based on each area corresponding to at least one display module of the plurality of display modules provided in various areas from one pixel to one LED cabinet.

In addition, the display apparatus 1 may calibrate an image signal corresponding to each region so that each region divided into the same area has a uniform light output. In this case, the display apparatus 1 may calibrate the image signal whenever the display region of the display 140 is divided based on each of the areas corresponding to the at least one display module. That is, calibration for the image signal is performed whenever the area to be divided is changed and calibration for the image signal is performed a plurality of times, thereby allowing the uniformity of the light output between pixels to be higher.

In addition, the display apparatus 1 may include a plurality of LED elements 10 and a pixel driving circuit for driving each LED element 10. The pixel driving circuit may serve to supply an image signal received to the plurality of LED elements 10, and may include a memory capable of storing coefficients according to implementation. In the embodiment, the pixel driving circuit may be included in a controller 120 of the display apparatus 1. The memory, which is allocated to each LED element 10, each display module 20, and each LED cabinet 30, may be included in a storage 130 of the display apparatus 1.

Referring to FIG. 2, the display apparatus 1 according to an embodiment may include a signal receiver 110 for receiving an image signal from the outside, the controller 120 for calibrating the uniformity of the light output between each pixel based on the received image signal, the storage 130 for storing light output corresponding to coefficients and division sizes obtained from the external device 2 or calibration coefficients corresponding to the coefficients and division sizes and the display 140 for displaying an image based on an image signal with uniformity calibration.

The display apparatus 1 may be implemented as a large format display (LFD) or the like, and may be configured to display an image on the display 140 based on a received image signal and a stored calibration coefficient.

However, embodiments of the display apparatus 1 are not limited to the LFD, and may be implemented as an apparatus, for example, various types of display apparatus 1 capable of displaying images such as TVs, monitors, portable media players, or mobile phones, which are a type of apparatus capable of displaying an image based on an image signal/image data supplied from an external device or embedded in itself.

The signal receiver 110 receives and transmits the image signal/image data. The signal receiver 110 may be variously provided corresponding to the formats of the received image signal and the types of the display apparatus 1. For example, the signal receiver 110 may receive a radio frequency (RF) signal from a broadcasting station wirelessly, or may receive an image signal corresponding to the standards of composite video, component video, super video, SCART, high definition multimedia interface (HDMI), a display port, a unified display interface (UDI), or wireless HD by a wire.

When the image signal is a broadcast signal, the signal receiver 110 may further include a tuner configured to tune the broadcast signal for each channel, and may receive an image data packet from a server through a network.

In addition, the image signal received through the signal receiver 110 may correspond to an image signal having a plurality of gray scales. The image signal received through the signal receiver 110 may have various grayscales depending on the pixels.

The display 140 according to an embodiment displays an image based on an image signal under the control of the controller 120.

For example, the plurality of LED elements 10 of the display 140 is configured to output at least one corresponding pixel for displaying an image based on the received image signal.

According to its individual characteristics, the LED element 10 may output different levels of light even when an image signal of the same level is input to each LED element 10, which may cause unwanted light such as blurring or blurring of the image.

In order to improve blurring, the storage 130 according to an embodiment may store a reference calibration coefficient for calibrating the image signal.

For example, the storage 130 may store reference calibration coefficients corresponding to each of the plurality of division sizes. The reference calibration coefficient corresponds to the coefficient to be applied to the image signal at the reference grayscale for uniformity calibration.

In this case, each of the plurality of division sizes may correspond to a plurality of display modules having different numbers of pixels, that is, different areas.

In this case, the reference grayscale may include at least one first grayscale set in the low grayscale range among the plurality of grayscales, and at least one second grayscale set in the high grayscale range.

Because the storage 130 stores the reference calibration coefficients at both of the low grayscale and high grayscale, the display apparatus 1 may more accurately calculate the calibration coefficients for the entire grayscale range. That is, the display apparatus 1 may calculate a calibration coefficient for each grayscale based on the reference calibration coefficient. The calculation of the calibration coefficients for each grayscale will be described in detail later.

The division size may correspond to the size of one region when the display 140 is divided into a plurality of regions. The division size may be preset in the design stage of the display apparatus 1 or may be set by a user input.

The division size may correspond to areas of a plurality of display modules having various sizes from a display module including at least one pixel to a display module corresponding to one LED cabinet.

For example, the display 140 may include at least one pixel and a pixel driving circuit, and may include a plurality of display modules having different areas where the number of LED elements included in the display module, that is, the number of pixels, is different.

In addition, the display region of the display 140 may be divided to have the same area based on an area corresponding to any one of the plurality of display modules. The display apparatus 1 may calibrate an image signal corresponding to each region so that each region divided into the same area has a uniform light output.

In this case, the area corresponding to the display module 20, that is, the division size, may vary in the number of LED elements 10 included according to a setting. Specifically, the number of LED elements 10 corresponding to each of the rows and columns of the matrix of the LED elements 10 corresponding to the division size may be set differently.

In addition, the preset division size may correspond to the LED cabinet 30 including at least one display module 20. In this case, the division size corresponding to the LED cabinet 30 may vary in the number of display modules 20 included according to the setting and the size of the display module 20 according to the setting.

That is, the display apparatus 1 may select the division size to divide the display 140 in units of one LED element 10, that is, in units of one pixel. In addition, the division size may be selected to divide the display 140 in units of one LED cabinet 30. In this case, it may be understood that the division size is provided in various sizes between one LED element 10, that is, one pixel and one LED cabinet 30.

In addition, the display 140 may include a plurality of display modules 20 having various areas between one LED element 10, that is, one pixel and one LED cabinet 30.

As such, the display apparatus 1 may divide the display region of the display 140 based on a preset division size provided in various sizes, and may calibrate the uniformity of the image signal based on the division size.

To this end, as described above, the storage 130 may store reference calibration coefficients corresponding to each of the plurality of division sizes.

In this case, the reference calibration coefficients are determined and stored for each division size, and the reference calibration coefficients corresponding to each division size stored are used to perform uniformity calibration between a plurality of regions of the display 140 divided into the division size.

That is, the uniformity calibration is performed by applying the calibration coefficient, which is calculated based on the reference calibration coefficient according to the grayscale of the image signal, to the image signal corresponding to each region in order for the plurality of regions of the display 140 divided into one of the plurality of division sizes to output light uniformly to each other.

Hereinafter, in the embodiment of the disclosure, the uniformity of light output refers to uniformity of luminance, uniformity of chromaticity, or uniformity of luminance and chromaticity of light output and measured in each region of the display 140 divided into division sizes. Uniformity calibration refers to applying a calibration coefficient to a received image signal in order that each region of the display 140, which is divided into division sizes based on the same level of image signal, outputs the same level luminance of light, or the same level chromaticity of light, or the same luminance and chromaticity of light.

In addition, the reference calibration coefficient corresponding to each of the plurality of division sizes may include reference calibration coefficients for each of the plurality of regions of the display 140 that are separated by each division size. The reference calibration coefficient corresponding to any one division size may include reference calibration coefficients for each of a plurality of regions of the display 140 divided into any one division size.

Through this, the display apparatus 1 may calibrate the uniformity between regions more precisely by applying a calibration coefficient, which is calculated according to the grayscale of the image signal corresponding to each region based on the individual reference calibration coefficients for each region of the display 140 divided into any one division size, to the corresponding image signal.

The storage 130 may be implemented by a non-volatile memory (e.g. a writable read only memory (ROM)) in which data remains even if the display apparatus 1 is powered off, and changed matters can be reflected. In other words, the storage 130 may be implemented by one of a flash memory, an erasable and programmable read only memory (EPROM), or an electrically programmable read only memory (EEPROM).

In the embodiment, a reference calibration coefficient corresponding to each of the plurality of division sizes is described as being stored in one storage 130, but embodiments are not limited thereto. The display apparatus 1 may include a memory for storing reference calibration coefficients for each region of the display 140 divided into respective division sizes.

That is, the storage 130 may be configured to store reference calibration coefficients corresponding to each region in a memory allocated to each region of the display 140 separated by each division size.

The reference calibration coefficient stored in the storage 130 may be received from the external device 2 connected to the display apparatus 1 according to an embodiment. According to another embodiment, the reference calibration coefficient stored in the storage 130 may be calculated by the controller 120 of the display apparatus 1 based on the measured value of the light output received from the external device 2 connected with the display apparatus 1. In this case, the external device 2 and the display apparatus 1 may communicate through wired communication or wireless communication, and each may include a corresponding communication module to transmit and receive information.

For example, the display apparatus 1 may receive a reference calibration coefficient corresponding to each division size through the connected external device 2.

At this time, the external device 2 may include a color sensor capable of measuring an image displayed on the display 140 and a computer configured to allow the light output to be uniform based on the measured value, by determining a reference calibration coefficient for each of a plurality of regions of the display 140 separated by each division size and by inputting the determined reference calibration coefficient to the display apparatus 1.

Specifically, the external device 2 may calculate and determine a reference calibration coefficient for each of the plurality of regions of the display 140 that are separated by any one division size among a plurality of preset division sizes based on at least one of brightness and color of an image displayed on the display 140.

In addition, the external device 2 may input a reference calibration coefficient corresponding to each of the preset division sizes determined and calculated in this way, to the display apparatus 1. In addition, the display apparatus 1 may store reference calibration coefficients corresponding to each of the preset division sizes input from the external device 2 in the storage 130.

In another embodiment the external device 2 may include a color sensor. The external device 2 may perform only a function of measuring the image displayed on the display 140 and transmitting the measured value corresponding to the brightness or color of each of the plurality of regions of display 140 separated by each division size or the representative value which is the average of the measured values to the display apparatus 1.

In this case, the controller 120 of the display apparatus 1 may determine a reference calibration coefficient corresponding to each of the plurality of preset division sizes and store the reference calibration coefficient in the storage 130 based on the measured values that are input. As described above, the reference calibration coefficients corresponding to each of the preset division sizes include reference calibration coefficients for each of the plurality of regions of the display 140 separated by the corresponding division size. The configuration in which the controller 120 determines the reference calibration coefficient will be described later in detail.

The controller 120 controls the overall operation of the display apparatus 1. For example, the controller 120 according to an embodiment may calibrate the uniformity among the pixels constituting the display 140 a plurality of times by varying the division size that separates display 140.

The controller 120 according to an embodiment may divide the entire region of the display 140 a plurality of times so that each region divided based on each of the plurality of division sizes has the same division size, calibrate the image signal so that the light output between the regions divided into corresponding division sizes based on each of the plurality of division sizes is uniform and control the display 140 to display an image based on the calibrated image signal.

That is, the controller 120 may divide the entire region of display 140 by varying the division size and calibrate the image signal so that the light output between the divided regions is uniform for each division with a different division size.

For example, the controller 120 may divide the display region of the display 140 to have the same area based on an area corresponding to at least one display module among a plurality of display modules including various areas, i.e., varying the number of pixels they contain. The controller 120 may divide the display region of the display 140 to have the same area by including at least one display module among the plurality of display modules. In this case, the controller 120 may calibrate an image signal corresponding to each region so that each region divided into the same area has a uniform light output.

The controller 120 may select at least one display module of the plurality of display modules, calculate calibration coefficients for a plurality of grayscales corresponding to each of the selected display modules based on reference calibration coefficients corresponding to each of the selected display modules, apply the calculated calibration coefficient corresponding to each of the selected display modules to the image signal, and control the display 140 to display an image based on the image signal to which the calculated calibration coefficient is applied.

That is, the controller 120 may select at least one display module of the plurality of display modules. In this case, the controller 120 may select at least one display module among display modules according to a user's setting or a setting of a design stage.

In addition, the controller 120 may calculate calibration coefficients for a plurality of grayscales corresponding to each of the selected display modules based on reference calibration coefficients corresponding to each of the selected display modules stored in the storage 130. The controller 120 may calculate calibration coefficients at a plurality of grayscales corresponding to the display module based on reference calibration coefficients corresponding to any one of the selected display modules. In this case, the plurality of grayscales may correspond to the grayscale of the received image signal. The calculation of the calibration coefficients for each grayscale will be described in detail later.

In this case, the reference calibration coefficient corresponding to any one display module of the selected display module may include reference calibration coefficients for each of the plurality of regions of the display 140 separated by the corresponding display module. Through this, the controller 120 may calculate a calibration coefficient corresponding to each region for each of a plurality of regions of the display 140 corresponding to each display module based on the grayscale of the image signal corresponding to each region and the reference calibration coefficient corresponding to each region.

For example, the controller 120 may separate the display 140 into a plurality of first regions based on any one of the selected display modules, calculate a first calibration coefficient for each of the plurality of first regions based on the first reference calibration coefficient and the grayscale of each of the plurality of first regions, and apply the calculated first calibration coefficient to the image signal. In this case, the first reference calibration coefficient may correspond to a reference calibration coefficient corresponding to the corresponding display module, and may include reference calibration coefficients for each of the plurality of first regions of the display 140 separated by the corresponding display module.

In addition, the controller 120 may separate the display 140 into a plurality of second regions based on another one of the selected display modules, calculate a second calibration coefficient for each of the plurality of second regions based on the second reference calibration coefficient and the grayscale of each of the plurality of second regions, and apply the calculated second calibration coefficient to the image signal to which the calculated first calibration coefficients are applied. In this case, the second reference calibration coefficient may correspond to a reference calibration coefficient corresponding to the corresponding display module, and may include reference calibration coefficients for each of the plurality of second regions of the display 140 separated by the corresponding display module.

As such, the controller 120 may apply the calculated calibration coefficients corresponding to each of the selected display modules to the image signal and may control the display 140 to display an image based on an image signal to which the calculated calibration coefficient corresponding to each of the selected display modules is applied.

In addition, when the display module 20 or the LED cabinet 30 is replaced, the controller 120 according to an embodiment may identify a division size corresponding to the size of the replaced display module 20 or the LED cabinet 30.

The controller 120 according to an embodiment may calibrate a gamma value of the replaced display module 20 or the LED cabinet 30 based on a gamma calibration table corresponding to the identified division size.

In this case, the storage 130 may store a gamma calibration table corresponding to each of the plurality of preset division sizes.

The controller 120 according to an embodiment may apply a calculated calibration coefficient to an image signal corresponding to the replaced display module 20 or the LED cabinet 30 based on a reference calibration coefficient corresponding to the identified division size.

Through this, the display apparatus 1 may control the light output of the replaced display module 20 or the LED cabinet 30 to be uniform in the display 140 even when the display module 20 or the LED cabinet 30 constituting the display 140 is replaced.

That is, the controller 120 may identify a display module corresponding to an area of the replaced display module among the plurality of display modules having various areas, calibrate the gamma value of the replaced display module based on the gamma calibration table corresponding to the identified display module and apply the calculated calibration coefficient to an image signal corresponding to the replaced display module based on the reference calibration coefficient corresponding to the identified display module.

The controller 120 according to an embodiment may include at least one memory in which a program for performing the above-described operation and the operation described below is stored, and at least one processor for executing the stored program. In the case of a plurality of memories and processors, they may be integrated in one chip or may be provided in physically separated locations.

In addition, the display apparatus 1 may further include an input interface that receives an input from a user according to an embodiment.

The input interface according to an embodiment may include a keypad (or an input panel) including buttons such as a power key, numeric keys, and menu keys provided in the display apparatus 1. In addition, the input interface according to an embodiment may be implemented to further receive an input from an input device such as a remote control, a key board, and a mouse, which are separated from the display apparatus 1 and configured to generate a predetermined command, data, information, and signal and transmit the predetermined command, data, information, and signal to the display apparatus 1 to remotely control the display apparatus 1.

Figure 3:
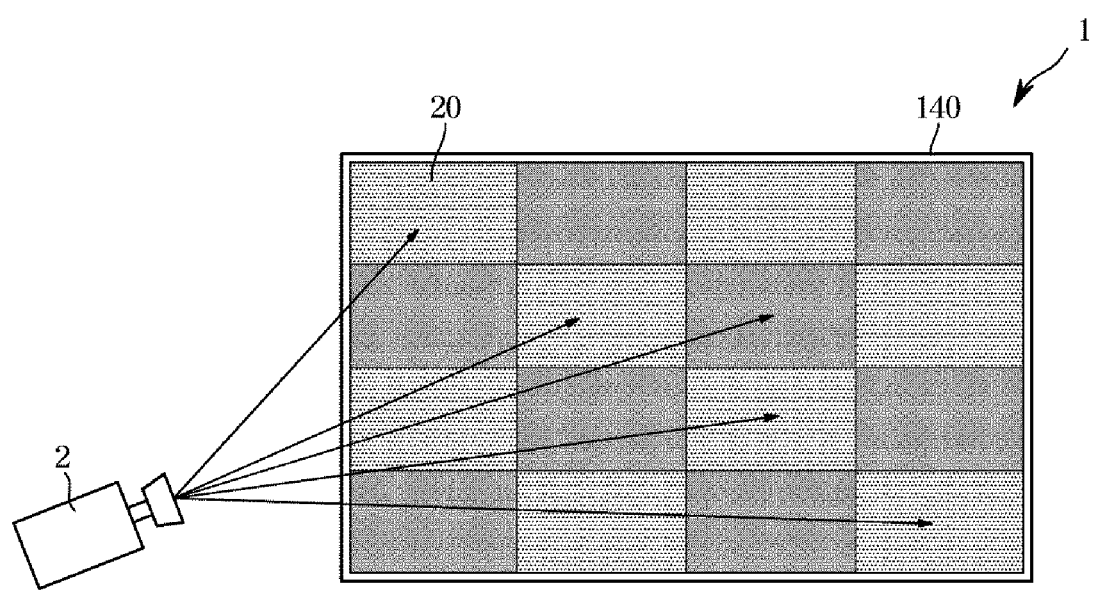
FIGS. 3 and 4 illustrate the display apparatus according to an embodiment of the disclosure and an external device for measuring light output of the display apparatus at different division sizes.
Figure 4:
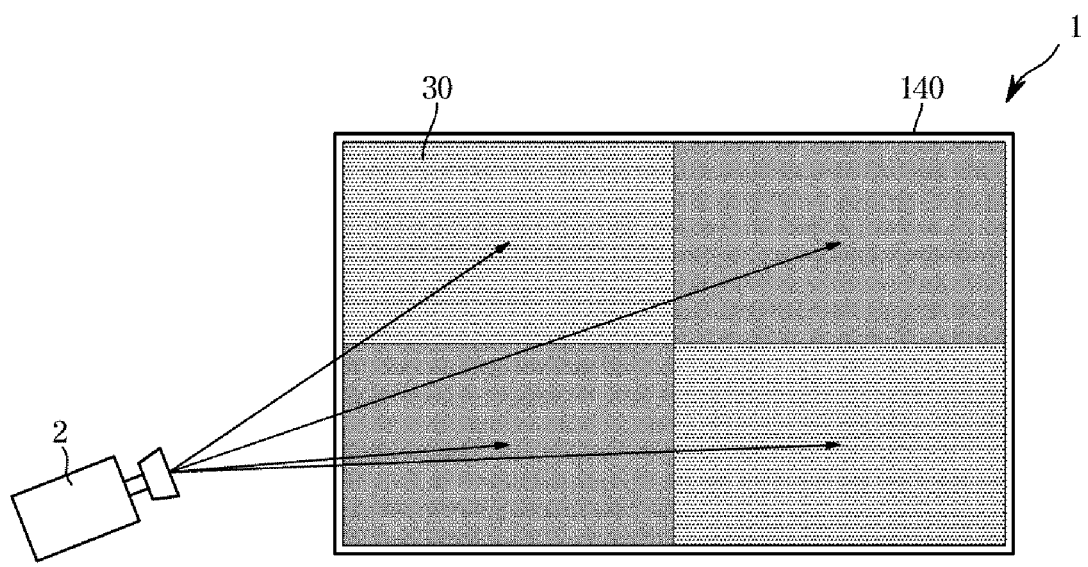

FIGS. 3 and 4 illustrate the display apparatus according to an embodiment and an external device for measuring light output of the display apparatus at different division sizes.

Referring to FIGS. 3 and 4, the display 140 according to an embodiment may be divided into one division size among preset division sizes. In this case, the display 140 may be divided into a plurality of regions each having the same division size.

In this case, the plurality of regions of the display 140 may correspond to the display module 20 including the plurality of LED elements 10, that is, the plurality of pixels, as illustrated in FIG. 3. The plurality of regions of the display 140 may correspond to the LED cabinet 30 including a plurality of display modules 20 as illustrated in FIG. 4. The plurality of regions of the display 140 may correspond to one LED element 10, that is, one pixel.

That is, the display region of the display 140 may be divided to have the same area based on each area corresponding to at least one display module of the plurality of display modules provided in various areas from one pixel to one LED cabinet.

The division size may correspond to areas of a plurality of display modules having various sizes from a display module including at least one pixel to a display module corresponding to one LED cabinet.

The display 140 may include at least one pixel and a pixel driving circuit, and may include a plurality of display modules having different areas. In this case, the different area may mean that the number of LED elements included in the display module, that is, the number of pixels, is different.

In addition, the display region of the display 140 may be divided to have the same area based on an area corresponding to any one of the plurality of display modules. The display apparatus 1 may calibrate an image signal corresponding to each region so that each region divided into the same area has a uniform light output.

As shown in FIGS. 3 and 4, each of the one LED element 10, the display module 20, and the LED cabinet 30, which may correspond to a plurality of regions of the display 140, may exhibit different luminance and chromaticity at the same grayscale according to electrical, physical or optical characteristics.

That is, the light output may not be uniform throughout the display 140 due to different output characteristics of the LED elements 10 included in the display 140. Light output may not be uniform throughout the display 140 due to different output characteristics of the display modules 20 included in the display 140. In addition, light output may not be uniform throughout the display 140 due to different output characteristics of the LED cabinets 30 included in the display 140.

In order to improve uniformity of light output by the display 140, the display apparatus 1 according to an embodiment may pre-store reference calibration coefficients corresponding to each preset division size and apply a calibration coefficient calculated based on the reference calibration coefficient to an image signal received based on each division size.

In this case, the display apparatus 1 may determine the reference calibration coefficient for each division size by using the external device 2 in order to store the reference calibration coefficient corresponding to each division size in advance.

Specifically, the external device 2 may measure light output of each of the plurality of regions of the display 140 separated by the preset division size and transmit the measured value to the display apparatus 1 or determine a reference calibration coefficient corresponding to each division size based on the measured value.

That is, the reference calibration coefficient stored in the storage 130 may be received from the external device 2 connected to the display apparatus 1 according to an embodiment and may be calculated by the controller 120 of the display apparatus 1 based on the measured value of the light output received from the external device 2 connected to the display apparatus 1 according to another embodiment.

In detail, the controller 120 may control the display 140 to output an image having the same reference grayscale for all the pixels of the display 140.

In this case, the reference grayscale may include at least one first grayscale set in the low grayscale range among the plurality of grayscales, and at least one second grayscale set in the high grayscale range among the plurality of grayscales.

The external device 2 may measure light output including luminance and chromaticity for each of a divided plurality of regions of the display 140 by separating the display 140, in which an image having the same reference grayscale is output for all pixels, by any one division size among a plurality of preset division sizes. At this time, the external device 2 may measure the light output for each of the plurality of preset division sizes. The external device 2 may separate the display 140 by each division size and measure the light output of separated each region.

The external device 2 or the controller 120 of the display apparatus 1 receiving the measured value may determine a reference calibration coefficient for the corresponding division size and the reference grayscale. For example, the external device 2 or the controller 120 of the display apparatus 1 receiving the measured value may determine the reference calibration coefficient of each region so that other regions output light at the same level as the reference region, based on the darkest region.

The external device 2 or the controller 120 of the display apparatus 1 receiving the measured value may determine a reference calibration coefficient corresponding to each of the plurality of preset division sizes based on measurement of an image displayed in the plurality of regions on the display 140 separated by any one division size among the plurality of preset division sizes.

In this case, the images displayed in the plurality of regions may correspond to images having the same reference grayscale, and the reference grayscale may include two or more reference grayscales preset according to a user's setting.

As described above, the reference grayscale may include at least one first grayscale at relatively low grayscales and at least one second grayscale at relatively high grayscales.

In this case, the setting for the first grayscale and the second grayscale may be included in the display apparatus 1 and may be input through an input interface that receives a user input.

Each of the reference calibration coefficients corresponding to each of the plurality of preset division sizes may include two or more measurement calibration coefficients generated based on an image displayed on the display 140 for two or more preset reference grayscales.

For example, the reference calibration coefficient corresponding to the division size corresponding to one pixel may include a measurement calibration coefficient corresponding to the first grayscale and a measurement calibration coefficient corresponding to the second grayscale. In this case, the measurement calibration coefficient corresponding to the first grayscale may correspond to the reference calibration coefficient at the low grayscale and, the measurement calibration coefficient corresponding to the second grayscale may correspond to the reference calibration coefficient at the high grayscale.

The external device 2 or the controller 120 of the display apparatus 1 receiving the measured value may determine a reference calibration coefficient corresponding to each of the plurality of regions based on measurement of an image displayed in the plurality of regions on the display 140 separated by any one division size among the plurality of preset division sizes.

The reference calibration coefficients corresponding to each of the plurality of preset division sizes may include reference calibration coefficients for each of the plurality of regions of the display 140 separated by the corresponding division size.

As such, the storage 130 according to an embodiment may store reference calibration coefficients corresponding to each of the plurality of preset division sizes, and the reference calibration coefficient corresponding to each division size may include reference calibration coefficients for each region of the display 140 separated by the corresponding division size.

Hereinafter a method of calculating a calibration coefficient for each of the plurality of grayscales in order for the controller 120 to calibrate the uniformity of the image signal having the plurality of grayscales received from the signal receiver 110 will be described.

Figure 5:
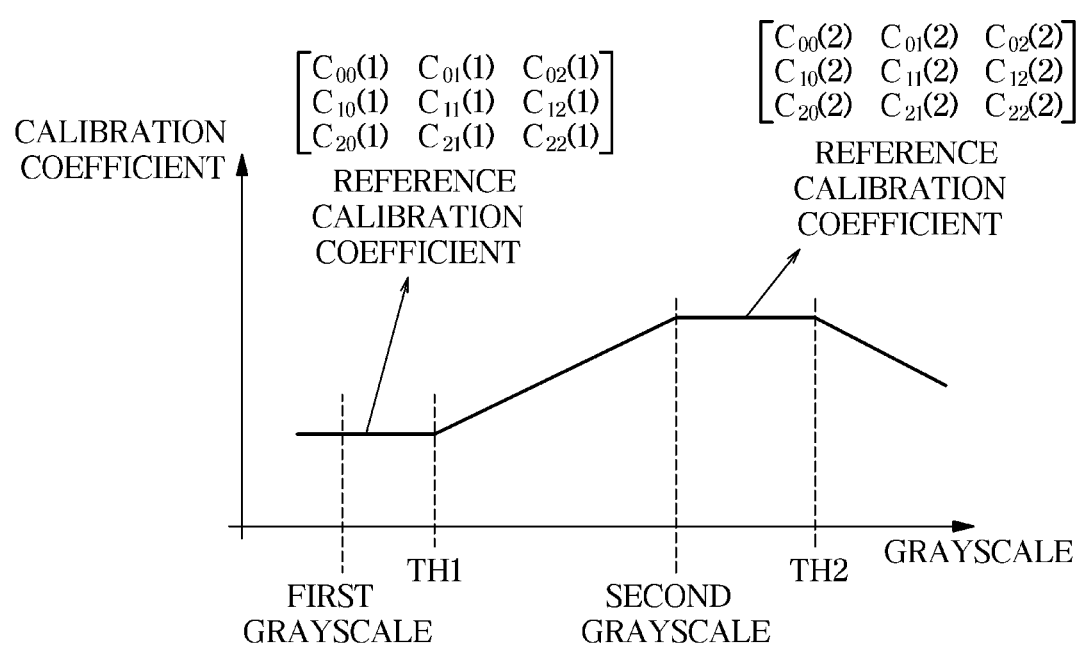
FIG. 5 illustrates a calibration coefficient according to the gray scale of the display apparatus according to an embodiment.

FIG. 5 illustrates a calibration coefficient according to the gray scale of the display apparatus according to the embodiment.

Referring to FIG. 5, uniformity of each of the plurality of regions of the display 140 separated by any one division size among the plurality of preset division sizes may be calibrated based on the reference calibration coefficients at the reference grayscale (e.g. the first grayscale and second grayscale), and a calibration coefficient calculated for each grayscale other than the reference grayscale based on the reference calibration coefficients.

The calibration coefficient according to the grayscale shown in FIG. 5 is only an example, and the reference grayscale may be set to two or more according to a user's setting, and the separation value (e.g., TH1 and TH2) of the grayscale range based on the reference grayscale may vary according to the user's setting. In addition, the calibration coefficient calculated based on the reference calibration coefficient may also vary according to the user's setting.

The controller 120 according to an embodiment may calculate calibration coefficients for the plurality of grayscales corresponding to each division size based on reference calibration coefficients for each of the plurality of preset division sizes.

That is, the controller 120 may calculate a calibration coefficient for each of the plurality of grayscales of the image signal received through the signal receiver 110 based on the reference calibration coefficient for the corresponding division size.

In this case, calibration coefficients for the plurality of grayscales corresponding to each division size may be calculated for each of the plurality of regions of the display 140 separated by each division size. The calculated calibration coefficients may be applied to the image signal of the corresponding region.

As described above, the storage 130 stores the reference calibration coefficients determined in the reference grayscale for each of the plurality of preset division sizes.

In this case, the image signal received through the signal receiver 110 may include a plurality of grayscales other than the reference grayscale. The controller 120 according to an embodiment may calculate a calibration coefficient for each of the plurality of grayscales based on the reference calibration coefficients in the reference grayscale.

The display apparatus 1 according to an embodiment may determine and store a calibration coefficient based on the light output measurement for only some reference grayscales and may calculate a calibration coefficient based on a reference calibration coefficient at the reference grayscale for other grayscales.

By determining the calibration coefficients for only a few grayscales, the time spent on light output measurements may be saved, and the storage space may be flexibly used by ensuring a large storage space.

For example, the controller 120 according to an embodiment may calculate a reference calibration coefficient corresponding to the reference grayscale with respect to the grayscale section set by the user based on the reference grayscale, as the calculated calibration coefficient.

For example, the controller 120 may calculate a reference calibration coefficient corresponding to the first grayscale as a calibration coefficient at the corresponding grayscale for the grayscale section (from the first grayscale to the TH1 grayscale) set by the user based on the first grayscale.

In addition, the controller 120 may calculate a reference calibration coefficient corresponding to the second grayscale as a calibration coefficient at the corresponding grayscale for the grayscale section (from the second grayscale to the TH2 grayscale) set by the user based on the second grayscale.

In addition, the controller 120 according to an embodiment may calculate a calibration coefficient at a corresponding grayscale based on a reference calibration coefficient corresponding to a reference grayscale having the lowest grayscale for grayscale section at or below the reference grayscale (e.g., the first grayscale in FIG. 5) with the lowest grayscale.

For example, when the grayscale of the R color of the input image signal is lower than or equal to the first grayscale, the controller 120 may calculate a value, to which coefficients a (i), b (i), and c (i) for calculation are applied to each item ($C_{00}(1)$, $C_{01}(1)$, $C_{02}(1)$) related to the R color of the reference calibration coefficient corresponding to the first grayscale, as calibration coefficients at the corresponding grayscale.

In this case, i is an input grayscale, and a (i+1) may have a different value from a (i). The lower the grayscale, the greater the variation in the light output between pixels compared to the higher grayscale. Therefore, the coefficients a (i), b (i), and c (i) for calculation may become larger as i approaches the first grayscale. When i is the first grayscale, a (i), b (i), and c (i) are 1, and a reference calibration coefficient corresponding to the first grayscale may be calculated as a calibration coefficient at the corresponding grayscale.

In another embodiment, a (i), b (i), and c (i) may be set to 1 so that a reference calibration coefficient corresponding to the first grayscale and a calibration coefficient calculated at the corresponding grayscale are always the same value in the range in which the grayscale of the image signal is less than or equal to the first grayscale.

In addition, the controller 120 according to an embodiment may calculate the calibration coefficient at the corresponding grayscale based on the reference calibration coefficient corresponding to each of the reference grayscales (e.g., the first grayscale and the second grayscale of FIG. 1) having the grayscale sections therebetween for the grayscale section between the reference grayscales.

For example, when the grayscale of the R color of the input image signal is higher than the first grayscale and lower than or equal to the second grayscale, the controller may apply coefficients d (i), f (i) and h (i) for calculation to each item ($C_{00}(1)$, $C_{01}(1)$, $C_{02}(1)$) associated with the R color of the reference calibration coefficient corresponding to the first grayscale, and apply the coefficients e (i), g (i), and i (i) for calculation to each of the items ($C_{00}(2)$, $C_{01}(2)$, $C_{02}(2)$) related to the R color of the reference calibration coefficient corresponding to the second grayscale, and calculate the sum as a calibration coefficient at the corresponding grayscale.

At this time, the coefficients d (i), f (i), and h (i) applied to the reference calibration coefficient corresponding to the first grayscale may become lower as the grayscale increases, and the coefficients e (i), g (i), and i (i) applied to the reference calibration coefficient corresponding to the second grayscale may increase as the grayscale increases. When the grayscale of the input image signal is equal to the second grayscale, d (i), f (i), and h (i) becomes 0 (zero), and e (i), g (i), and i (i) becomes 1. Therefore, In this case, the calibration coefficient at the corresponding grayscale and the reference calibration coefficient corresponding to the second grayscale have the same value.

In addition, the controller 120 according to an embodiment may calculate a calibration coefficient at a corresponding grayscale based on a reference calibration coefficient corresponding to a reference grayscale having the highest grayscale for grayscale section at or above the reference grayscale (e.g., the second grayscale in FIG. 5) with the highest grayscale.

For example, when the grayscale of the R color of the input image signal is higher than the second grayscale, the controller 120 may calculate a value, to which coefficients j(i), k(i), and l (i) for calculation are applied to each item ($C_{00}(2)$, $C_{01}(2)$, $C_{02}(2)$) related to the R color of the reference calibration coefficient corresponding to the second grayscale, as calibration coefficients at the corresponding grayscale.

Coefficients j (i), k (i), and l (i) applied to the reference calibration coefficients corresponding to the second grayscale to calculate the calibration coefficients for grayscales higher than the second grayscale may be higher or lower as the grayscale increases.

In another embodiment, j (i), k (i), and l (i) may be set to 1 so that the calibration coefficient for the corresponding grayscale and the second reference calibration coefficient are always the same value in the range where the grayscale of the image signal is higher than the second grayscale.

In addition, although only the R color is described for each grayscale, the calibration coefficient items related to the G color and the B color may be obtained through the method described above.

The controller 120 may calculate a calibration coefficient corresponding to each color based on the color, and apply each of the calibration coefficients corresponding to the color to the signal of the corresponding color among the image signals received through the signal receiver 110.

As such, the controller 120 according to one embodiment may select two or more division sizes from among the plurality of preset division sizes and calculate calibration coefficients for the plurality of grayscales corresponding to each of the selected division sizes based on reference calibration coefficients corresponding to each of the selected division sizes.

In addition, the controller 120 may apply the calculated calibration coefficients for the plurality of grayscales corresponding to each of the selected division sizes to the image signal, and control the display 140 to display an image based on the image signal to which the calculated calibration coefficient is applied.

Hereinafter it will be described in detail that the controller 120 performs the uniformity calibration over a plurality of times by changing the division size. The controller 120 may calculate calibration coefficients for a plurality of grayscales corresponding to each of the selected division sizes based on reference calibration coefficients calculated corresponding to each of the selected division sizes and perform uniformity calibration by applying the calculated calibration coefficient corresponding to each division size to the image signal based on each of the selected division sizes.

Figure 6:
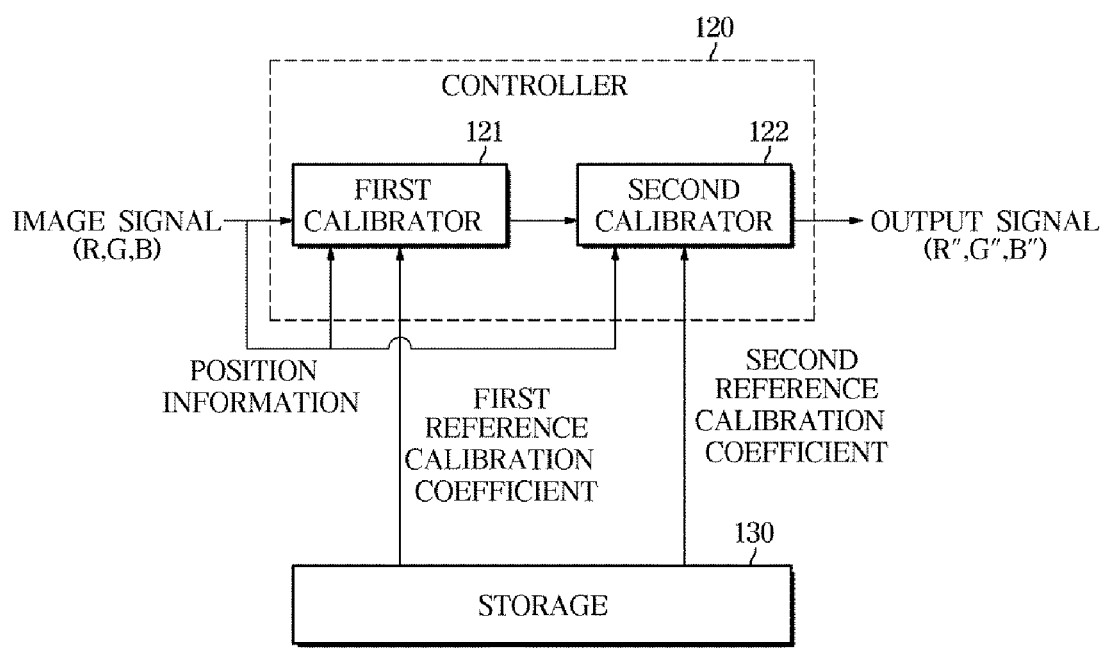
FIG. 6 is a block diagram of a case in which the display apparatus according to an embodiment performs uniformity calibration.
Figure 7:
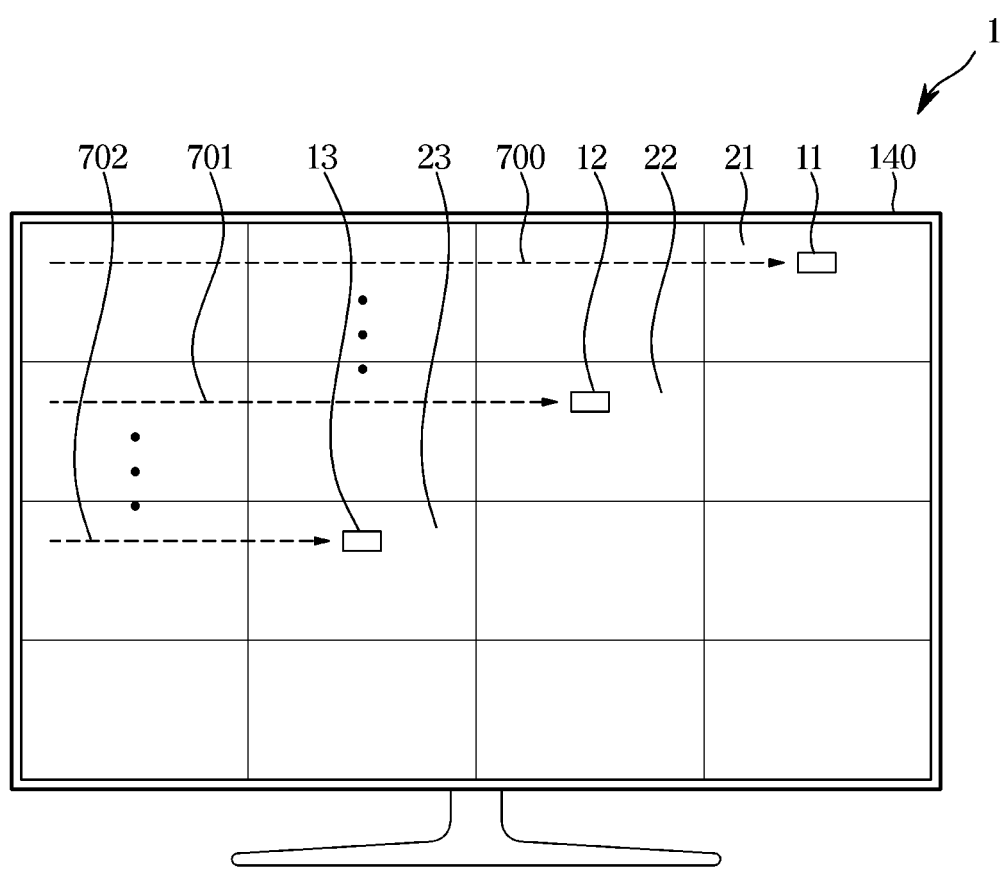
FIG. 7 illustrates a scanning operation for displaying an image by the display apparatus according to an embodiment.

FIG. 6 is a block diagram of a case in which the display apparatus according to an embodiment performs uniformity calibration. FIG. 7 illustrates a scanning operation for displaying an image by the display apparatus according to an embodiment.

Referring to FIG. 6, the controller 120 according to an embodiment may calibrate the uniformity among the pixels constituting the display 140 a plurality of times by varying the division size that separates the display 140.

In detail, the controller 120 may select two or more division sizes from among the plurality of preset division sizes, calculate calibration coefficients for a plurality of grayscales corresponding to each of the selected division sizes based on reference calibration coefficients corresponding to each of the selected division sizes, apply the calculated calibration coefficients corresponding to each of the selected division sizes to the image signal, and control the display 140 to display an image based on the image signal to which the calculated calibration coefficient is applied.

Hereinafter the case where two division sizes are selected from among the plurality of preset division sizes is described.

In this case, two display modules may be selected from among a plurality of display modules having different preset areas.

In detail, a first calibrator 121 of the controller 120 may separate the display 140 into a plurality of first regions based on the first division size among the selected division sizes, and each first region may have a first division size.

At this time, the first calibrator 121 of the controller 120 may receive a first reference calibration coefficient corresponding to the first division size from the storage 130 and determine a grayscale corresponding to each of the plurality of first regions of the display 140 based on the position information of the pixels included in the image signal.

The first calibrator 121 of the controller 120 according to an embodiment may calculate a first calibration coefficient for each of the plurality of first regions based on the first reference calibration coefficient and the grayscale of each of the plurality of first regions, and apply the calculated first calibration coefficient to the image signal received from the signal receiver 110. In this case, each of the first calibration coefficients calculated for each of the plurality of first regions may be applied to an image signal in the corresponding first region.

In this case, the first reference calibration coefficient may correspond to a reference calibration coefficient corresponding to the first division size, and may include reference calibration coefficients for each of a plurality of first regions of the display 140 separated by the first division size.

By applying the first calibration coefficient to the received image signal, the light output between the plurality of first regions of the display 140 may be calibrated to be uniform.

A second calibrator 122 of the controller 120 may separate the display 140 into a plurality of second regions based on the second division size different from the first division size among the selected division sizes. That is, each second region may have a second division size.

At this time, the second calibrator 122 of the controller 120 may receive a second reference calibration coefficient corresponding to the second division size from the storage 130 and determine a grayscale corresponding to each of the plurality of second regions of the display 140 based on the position information of the pixels included in the image signal.

The second calibrator 122 of the controller 120 according to an embodiment may calculate a second calibration coefficient for each of the plurality of second regions based on the second reference calibration coefficient and the grayscale of each of the plurality of second regions, and apply the calculated second calibration coefficient to the image signal to which the calculated first calibration coefficients are applied. In this case, each of the second calibration coefficients calculated for each of the plurality of second regions may be applied to an image signal in the corresponding second region.

In this case, the second reference calibration coefficient may correspond to a reference calibration coefficient corresponding to the second division size, and may include reference calibration coefficients for each of the plurality of second regions of the display 140 separated by the second division size.

As the second calibration coefficient is applied to the image signal to which the first calibration coefficient is applied, the light output between the plurality of second regions of the display 140, which may not be uniform even though the first calibration coefficient is applied, may be calibrated to be uniform.

As such, the image signals R, G, and B input through the signal receiver 110 may be changed into signals R' G' and B' having uniformly calibrated light output between the first regions by applying the first calibration coefficient by the first calibrator 121 of the controller 120 as shown in <Equation 1>. In this case, the first calibration coefficient may be represented by a 3×3 matrix.

$$\begin{pmatrix} R' \\ G' \\ B' \end{pmatrix} = \begin{pmatrix} L_{11} & L_{12} & L_{13} \\ L_{21} & L_{22} & L_{23} \\ L_{31} & L_{32} & L_{33} \end{pmatrix} * \begin{pmatrix} R \\ G \\ B \end{pmatrix} \qquad <\text{Equation 1}>$$

Also, the signals R', G', and B', in which the first calibration coefficient is applied and the light output between the first regions are uniformly calibrated, may be changed into signals R'', G'', and B'' having uniformly calibrated light output between the second regions by applying the second calibration coefficient by the second calibrator 122 of the controller 120 as shown in <Equation 2>. In this case, the second calibration coefficient may be represented by a 3×3 matrix.

$$\begin{pmatrix} R'' \\ G'' \\ B'' \end{pmatrix} = \begin{pmatrix} G_{11} & G_{12} & G_{13} \\ G_{21} & G_{22} & G_{23} \\ G_{31} & G_{32} & G_{33} \end{pmatrix} * \begin{pmatrix} R' \\ G' \\ B' \end{pmatrix} \qquad <\text{Equation 2}>$$

As such, the controller 120 may calibrate improve the uniformity of the display 140 by performing uniformity calibration on the first region divided by the first division size and by performing uniformity calibration on the second region divided by the second division size.

The uniformity calibration between the first regions divided by the first division size, the light output deviation between the second regions may occur, and thus the controller 120 may calibrate the uniformity of the entire display 140 more accurately by performing uniformity calibration on the second region.

Referring to FIG. 7, the controller 120 according to an embodiment may scan an image signal, to which a calibration coefficient is applied to the display 140, to display an image on the display 140 by applying the first calibration coefficient and the second calibration coefficient to the image signal received through the signal receiver 110.

In an embodiment, to display an image of a scene, the display apparatus 1 is described as using progressive scanning that is performed by starting from the top left of the screen to the bottom right of the screen one by one in order to display an image, but embodiments are not limited thereto.

That is, the controller 120 of the display apparatus 1, as described above, prior to displaying an image, may apply the first calibration coefficient corresponding to the first division size and the second calibration coefficient corresponding to the second division size to the image signal sequentially or simultaneously.

The display of the image is made in the direction indicated by the arrows 700, 701, and 702. The display of an image is performed by displaying all pixels of one line and then displaying pixels of the next line.

Hereinafter it will be described that the first division size corresponds to one LED element 10 and the second division size corresponds to the display module 20 including the plurality of LED elements 10.

According to an embodiment, prior to displaying pixels in the application of the first calibration coefficients, the controller 120 may apply a first calibration coefficient corresponding to the corresponding LED element 10 to the image signal corresponding to the position of the corresponding pixel based on the position of the pixel indicated by the position information of the image signal.

In addition, the controller 120 determines the display module 20 according to the position of the pixel in order to apply the second calibration coefficient, and then may apply the determined second calibration coefficient of the display module 20 to the signal to which the first calibration coefficient is applied.

For example, the controller 120 may control the display 140 to sequentially display pixels of an image according to arrows 700, 701, and 702. In order to display the pixel indicated by the position information of the image signal, the controller 120 may apply a first calibration coefficient of the corresponding LED element 11, 12, and 13 to the image signal based on the position of the pixel, and apply a second coefficient of the display module 21, 22, and 23 determined based on the position of the pixel to the image signal. In FIG. 7, three arrows 700, 701, and 702 are illustrated, but embodiments are not limited thereto.

In the above, it has been described that the controller 120 performs uniformity calibration by selecting two division sizes. However, there is no limit to the number of division sizes that can be selected. The controller 120 may provide a calibrator for the number of selected division sizes to perform uniformity calibration in each division size.

In this case, the output signal finally output to the display 140 may correspond to a signal on which uniformity calibration is performed based on each division size as many as the number of division sizes selected from the input image signal.

In addition, it has been described that uniformity calibration for one division size is performed after uniformity calibration for one division size is performed. However, embodiments are not limited thereto, and uniformity calibration may be performed sequentially or simultaneously.

As such, the controller 120 may apply the calculated calibration coefficients corresponding to each of the selected division sizes to the image signal and control the display 140 to display an image based on an image signal to which a calculated calibration coefficient corresponding to each of the selected division sizes is applied.

Hereinafter a control method of the display apparatus 1 according to an embodiment will be described. The display apparatus 1 according to the above-described embodiment may be applied to a control method of the display apparatus 1 to be described later. Therefore, embodiments described above with reference to FIGS. 1 to 7 may be equally applicable to the control method of the display apparatus 1 according to an embodiment.

Figure 8:
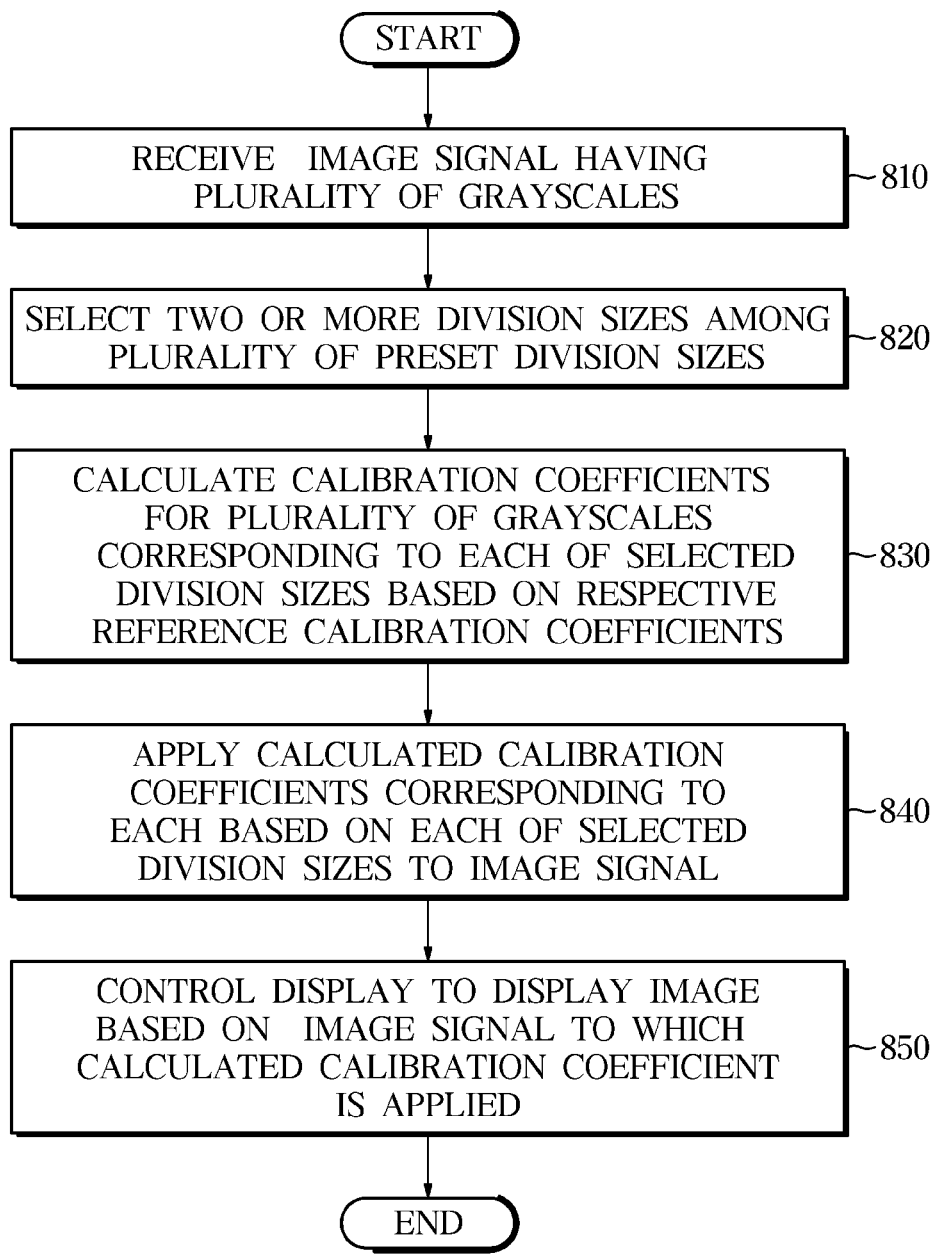
FIG. 8 is a flowchart illustrating a case in which the uniformity of the display is calibrated in a control method of a display apparatus according to the embodiment.

FIG. 8 is a flowchart illustrating a case in which the uniformity of the display is calibrated in the control method of the display apparatus according to the embodiment.

Referring to FIG. 8, the display apparatus 1 according to an embodiment may receive an image signal having a plurality of grayscales (S810). For example, the display apparatus 1 may receive an image signal through the signal receiver 110, and the received image signal may include a plurality of grayscales according to pixels.

The controller 120 of the display apparatus 1 according to an embodiment may select two or more division sizes among a plurality of preset division sizes (S820).

For example, the controller 120 may select two or more division sizes among the plurality of preset division sizes in accordance with the user's setting or the setting of the design stage.

The plurality of preset division sizes may correspond to one LED element 10, that is, one pixel and may correspond to the display module 20 including a plurality of pixels including two or more LED elements 10.

In this case, the division size corresponding to the display module 20 may vary in the number of LED elements 10 included according to a setting. Specifically, the number of LED elements 10 corresponding to each of the rows and columns of the matrix of the LED elements 10 corresponding to the division size may be set differently.

In addition, the preset division size may correspond to the LED cabinet 30 including two or more display module 20. In this case, the division size corresponding to the LED cabinet 30 may vary in the number of display modules 20 included according to the setting and the size of the display module 20 according to the setting.

The display apparatus 1 may select the division size to divide the display 140 in units of one LED element 10. In addition, the division size may be selected to divide the display 140 in units of one LED cabinet 30. In this case, it may be understood that the division size is provided in various sizes between one LED element 10 and one LED cabinet 30.

As such, the display apparatus 1 may divide the display 140 based on the preset division size provided in various sizes, and may calibrate the uniformity of the image signal based on the division size.

That is, the division size may correspond to areas of a plurality of display modules having various sizes from a display module including at least one pixel to a display module corresponding to one LED cabinet.

The display 140 may include at least one pixel and a pixel driving circuit, and may include a plurality of display modules having different areas. In this case, the different area may mean that the number of LED elements included in the display module, that is, the number of pixels, is different.

In addition, the display region of the display 140 may be divided to have the same area based on an area corresponding to any one of the plurality of display modules. The display apparatus 1 may calibrate an image signal corresponding to each region so that each region divided into the same area has a uniform light output.

To this end, the controller 120 of the display apparatus 1 according to an embodiment may calculate calibration coefficients for the plurality of grayscales corresponding to each of the selected division sizes based on the respective reference calibration coefficients (S830) and may apply the calculated calibration coefficients corresponding to each based on each of the selected division sizes to the image signal (S840).

In addition, the controller 120 may calculate calibration coefficients for a plurality of grayscales corresponding to each of the selected division sizes based on reference calibration coefficients corresponding to each of the selected division sizes stored in the storage 130. The controller 120 may calculate calibration coefficients at a plurality of grayscales corresponding to the division size based on reference calibration coefficients corresponding to any one of the selected division size. In this case, the plurality of grayscales may correspond to the grayscale of the received image signal.

In this case, the reference calibration coefficient corresponding to any one division size of the selected division size may include reference calibration coefficients for each of the plurality of regions of the display 140 separated by the corresponding division size. Through this, the controller 120 may calculate a calibration coefficient corresponding to each region for each of the plurality of regions of the display 140 corresponding to each division size based on the grayscale of the image signal corresponding to each region and the reference calibration coefficient corresponding to each region.

In addition, the controller 120 of the display apparatus 1 according to an embodiment may control the display 140 to display an image based on an image signal to which the calculated calibration coefficient is applied (S850).

As such, the controller 120 may apply the calculated calibration coefficients corresponding to each of the selected division sizes to the image signal and may control the display 140 to display an image based on an image signal to which a calculated calibration coefficient corresponding to each of the selected division sizes is applied.

That is, the controller 120 divides the entire region of the display 140 a plurality of times so that each region divided based on each of the plurality of division sizes has the same division size, calibrate the image signal so that the light output between the regions divided into corresponding division sizes based on each of the plurality of division sizes is uniform, and control the display 140 to display an image based on the calibrated image signal.

The controller 120 may divide the entire region of the display 140 by varying the division size and calibrate the image signal so that the light output between the divided regions is uniform for each division with a different division size.

Figure 9:
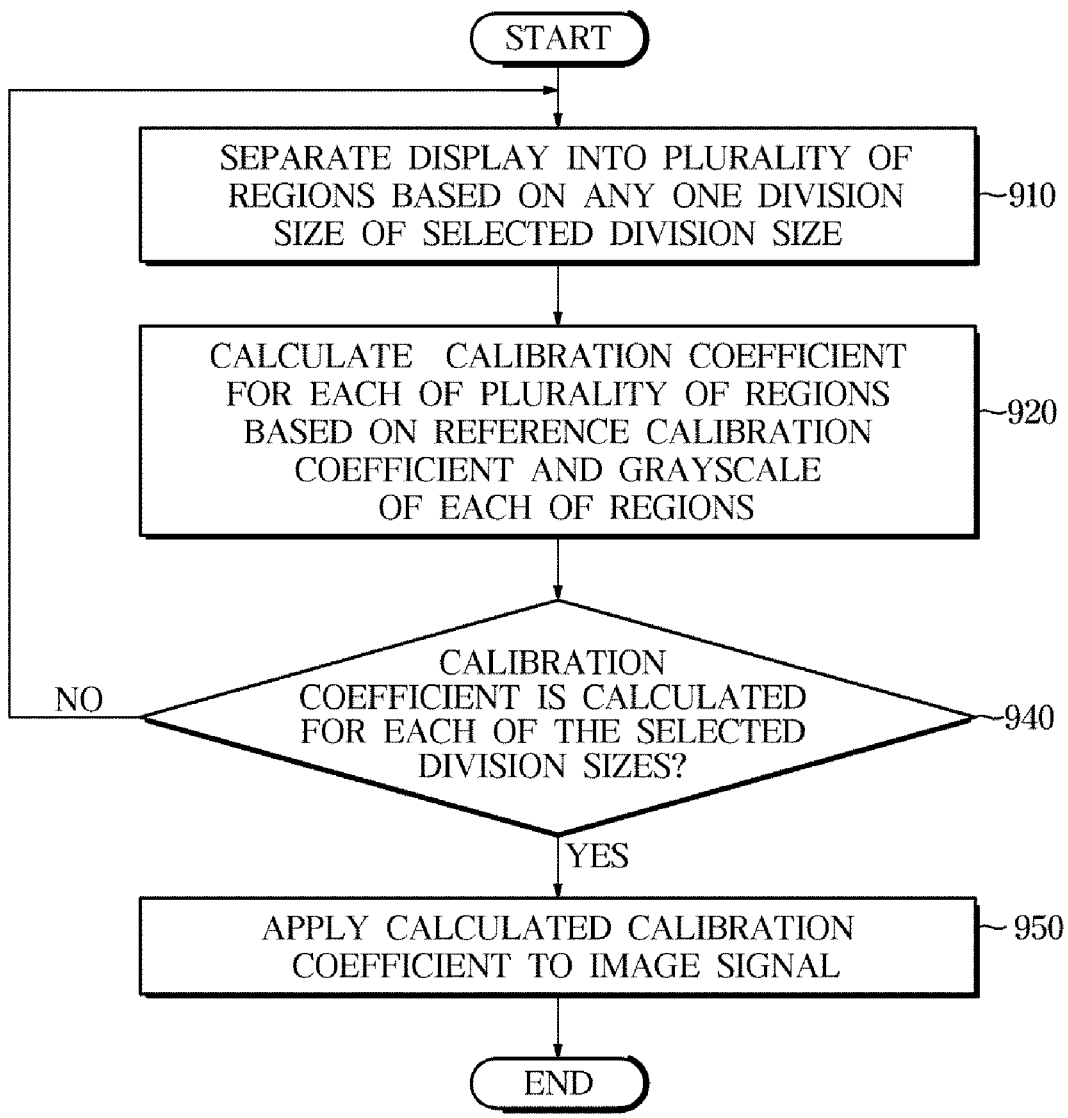
FIG. 9 is a flowchart illustrating an example where a calibration coefficient is calculated and applied to an image signal in a control method of a display apparatus according to the embodiment.

FIG. 9 is a flowchart illustrating a case where a calibration coefficient is calculated and applied to an image signal in the control method of the display apparatus according to the embodiment of the disclosure.

Referring to FIG. 9, the controller 120 of the display apparatus 1 according to an embodiment may separate the display 140 into a plurality of regions based on any one division size of the selected division size (S910).

In addition, the controller 120 of the display apparatus 1 according to an embodiment may calculate a calibration coefficient for each of the plurality of regions based on the reference calibration coefficients and the grayscale of each of the regions (S920).

In this case, when the calibration coefficient is not calculated for each of the selected division sizes (NO in S940), the controller 120 may repeat steps 910 and 920 until the calibration coefficients are calculated for each of the selected division sizes.

When the calibration coefficient is calculated for each of the selected division sizes (YES in S940), the controller 120 may apply the calculated calibration coefficient to the image signal (S950).

For example, the controller 120 may divide the display 140 into a plurality of first regions based on any one of the selected division sizes, calculate a first calibration coefficient for each of the plurality of first regions based on the first reference calibration coefficient and the grayscale of each of the plurality of first regions, and apply the calculated first calibration coefficient to the image signal. In this case, the first reference calibration coefficient may correspond to a reference calibration coefficient corresponding to the corresponding division size, and may include reference calibration coefficients for each of the plurality of first regions of the display 140 separated by the corresponding division size.

For example, the controller 120 may divide the display 140 into a plurality of second regions based on one of the selected division sizes, calculate a second calibration coefficient for each of the plurality of second regions based on the second reference calibration coefficient and the grayscale of each of the plurality of second regions, and apply the calculated second calibration coefficient to the image signal to which the calculated first calibration coefficients are applied. In this case, the second reference calibration coefficient may correspond to a reference calibration coefficient corresponding to the corresponding division size, and may include reference calibration coefficients for each of the plurality of second regions of the display 140 separated by the corresponding division size.

As such, the controller 120 may apply the calculated calibration coefficients corresponding to each of the selected division sizes to the image signal and may control the display 140 to display an image based on an image signal to which a calculated calibration coefficient corresponding to each of the selected division sizes is applied.

Figure 10:
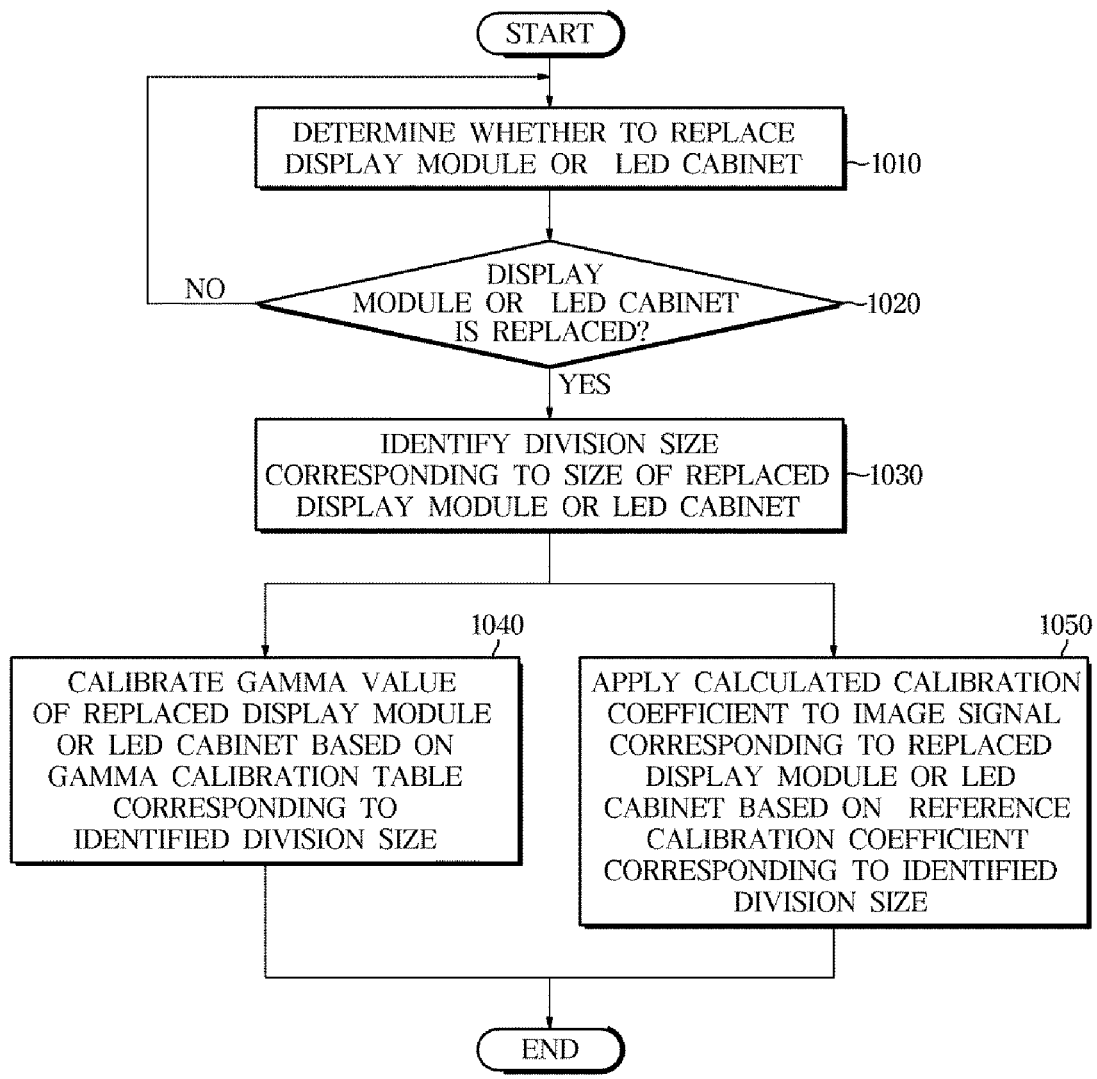
FIG. 10 is a flowchart illustrating a case of replacing a display module or an LED cabinet in a control method of a display apparatus according to an embodiment.

FIG. 10 is a flowchart illustrating a case of replacing a display module or an LED cabinet in the control method of the display apparatus according to an embodiment.

Referring to FIG. 10, the controller 120 of the display apparatus 1 according to an embodiment may determine whether or not the display module 20 or the LED cabinet 30 is replaced (S1010).

In detail, the controller 120 may determine whether to replace the display module 20 or the LED cabinet 30 based on a unique identification number assigned to the display module 20 or the LED cabinet 30.

In addition, the controller 120 may determine whether to replace the display module 20 or the LED cabinet 30 based on a user's input through an input interface. However, the method of determining whether to replace the display module 20 or the LED cabinet 30 is not limited to the above example. A method of confirming replacement of the display module 20 or the LED cabinet 30 may be included in the embodiment without limitation.

When the display module 20 or the LED cabinet 30 is replaced (YES in S1020), the controller 120 of the display apparatus 1 according to an embodiment may identify a division size corresponding to the size of the replaced display module 20 or the LED cabinet 30 (S1030).

The controller 120 according to an embodiment may calibrate the gamma value of the replaced display module 20 or the LED cabinet 30 based on the gamma calibration table corresponding to the determined division size (S1040). In this case, the storage 130 may store a gamma calibration table corresponding to each of a plurality of preset division sizes.

That is, the replaced display module 20 or the LED cabinet 30 may be calibrated to have a gamma value set by a user based on a gamma calibration table corresponding to a corresponding division size.

According to an embodiment, the controller 120 may apply a calculated calibration coefficient to an image signal corresponding to the replaced display module 20 or the LED cabinet 30 based on a reference calibration coefficient corresponding to the determined division size (S1050).

Through this, the display apparatus 1 may control the light output of the replaced display module 20 or the LED cabinet 30 to be uniform in the display 140 even when the display module 20 or the LED cabinet 30 constituting the display 140 is replaced.

That is, the controller 120 may determine a display module corresponding to an area of the replaced display module among the plurality of display modules having various areas, calibrate the gamma value of the replaced display module based on the gamma calibration table corresponding to the determined display module and apply the calculated calibration coefficient to an image signal corresponding to the replaced display module based on the reference calibration coefficient corresponding to the determined display module.

According to the display apparatus and the control method thereof of the disclosure, the light output between the pixels can be made more uniform by calibrating the uniformity between the pixels forming the display panel a plurality of times by varying the division size for dividing the display panel.

The embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes various types of recording media in which instructions which can be decoded by a computer are stored. For example, there may be a ROM, a random access memory (RAM), a magnetic tape, a magnetic disk, a flash memory, and an optical data storage device.

Although embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A display apparatus comprising:
   a display comprising a plurality of display modules, each display module of the plurality of display modules comprising a pixel driving circuit and at least one pixel comprising a red inorganic light emitting element, a green inorganic light emitting element, and a blue inorganic light emitting element;
   a signal receiver configured to receive an image signal having a plurality of grayscales; and
   a controller configured to:
   divide the display into a plurality of regions, each region of the plurality of regions having a same area and comprising at least one display module among the plurality of display modules,
   calibrate the image signal to output uniform light from each of the plurality of regions, and
   control the pixel driving circuit to display an image based on the calibrated image signal,
   wherein the controller is further configured to determine a calibration coefficient for each grayscale corresponding to each of the plurality of display modules based on a reference calibration coefficient corresponding to each of the plurality of display modules, and calibrate the image signal by applying the determined calibration coefficient to the image signal based on each of the plurality of display modules,
   wherein the reference calibration coefficient comprises a plurality of measurement calibration coefficients obtained based on a measurement of an image displayed on the display for a plurality of reference grayscales among the plurality of grayscales,
   wherein the plurality of reference grayscales comprises at least one first grayscale selected from low grayscales lower than a first value and at least one second grayscale selected from high grayscales higher than a second value, and
   wherein the controller is further configured to determine the determined calibration coefficient based on the reference calibration coefficient corresponding to a reference grayscale having a lowest grayscale included in a first grayscale section equal to or lower than the reference grayscale having the lowest grayscale.

2. The display apparatus according to claim 1, wherein the controller is further configured to determine the reference calibration coefficient corresponding to each of the plurality of display modules based on a measurement of an image displayed in the plurality of regions of the display divided to have an area corresponding to one of the plurality of display modules.

3. The display apparatus according to claim 1, wherein the controller is further configured to determine the reference calibration coefficient corresponding to the reference grayscale as the determined calibration coefficient for a grayscale section set by a user based on the reference grayscale.

4. The display apparatus according to claim 1, wherein the controller is further configured to determine the determined calibration coefficient based on the reference calibration coefficient corresponding to a reference grayscale having a highest grayscale included in a second grayscale section equal to or higher than the reference grayscale having the highest grayscale and determine the determined calibration coefficient based on the reference calibration coefficient corresponding to each of the reference grayscales having grayscale sections therebetween for a grayscale section between the reference grayscales.

5. The display apparatus according to claim 1, wherein the controller is further configured to:
   identify a display module corresponding to a display module which is replaced among the plurality of display modules; and
   calibrate a gamma value of the replaced display module based on a gamma calibration table corresponding to the identified display module or apply the determined calibration coefficient to an image signal corresponding to the replaced display module.

6. The display apparatus according to claim 1, wherein the reference calibration coefficient corresponding to one of the plurality of display modules comprises a reference calibration coefficient corresponding to each of a plurality of regions having an area corresponding to a display module among the plurality of display modules.

7. The display apparatus according to claim 6, wherein the controller is further configured to divide the display into a plurality of first regions based on an area corresponding to one of the plurality of display modules, determine a first calibration coefficient corresponding to each of the plurality of first regions based on a first reference calibration coefficient and a grayscale of each of the plurality of first regions, and calibrate the image signal by applying the determined first calibration coefficient to the image signal.

8. The display apparatus according to claim 7, wherein the controller is further configured to divide the display into a plurality of second regions based on an area corresponding to another display module of the plurality of display modules, determine a second calibration coefficient corresponding to each of the plurality of second regions based on a second reference calibration coefficient and a grayscale of each of the plurality of second regions, and calibrate the image signal by applying the determined second calibration coefficient to an image signal to which the determined first calibration coefficient is applied.

9. A control method of a display apparatus comprising a display comprising a plurality of display modules, each display module of the plurality of display modules comprising a pixel driving circuit and at least one pixel comprising a red inorganic light emitting element, a green inorganic light emitting element, and a blue inorganic light emitting element, the control method comprising:
receiving an image signal having a plurality of grayscales;
dividing a display region of the display into a plurality of regions, each region of the plurality of regions having a same area and comprising at least one display module among the plurality of display modules;
calibrating the image signal to output uniform light from each of the plurality of regions; and
controlling the pixel driving circuit to display an image based on the calibrated image signal,
wherein the calibrating the image signal comprises:
determining a calibration coefficient for each grayscale corresponding to each of the plurality of display modules based on a reference calibration coefficient corresponding to each of the plurality of display modules; and
calibrating the image signal by applying the determined calibration coefficient to the image signal based on each of the plurality of display modules,
wherein the reference calibration coefficient comprises a plurality of measurement calibration coefficients obtained based on a measurement of an image displayed on the display for a plurality of reference grayscales among the plurality of grayscales,
wherein the plurality of reference grayscales comprises at least one first grayscale selected from low grayscales lower than a first value and at least one second grayscale selected from high grayscales higher than a second value, and
wherein determining the calibration coefficient for each grayscale further comprises determining the determined calibration coefficient based on the reference calibration coefficient corresponding to a reference grayscale having a highest grayscale included in a second grayscale section equal to or higher than the reference grayscale having the highest grayscale.

10. The control method according to claim 9, further comprising:
determining the reference calibration coefficient corresponding to each of the plurality of display modules based on a measurement of an image displayed in the plurality of regions of the display divided into an area corresponding to one of the plurality of display modules.

11. The control method according to claim 9, wherein the determining the calibration coefficient for each grayscale comprises:
determining the reference calibration coefficient corresponding to a reference grayscale as the determined calibration coefficient for a grayscale section set by a user based on the reference grayscale; and
determining the determined calibration coefficient based on the reference calibration coefficient corresponding to the reference grayscale having a lowest grayscale included in a first grayscale section equal to or lower than the reference grayscale having the lowest grayscale.

12. The control method according to claim 9, wherein the determining the calibration coefficient for each grayscale further comprises:
determining the determined calibration coefficient based on the reference calibration coefficient corresponding to each of the reference grayscales having grayscale sections therebetween for a grayscale section between the reference grayscales.

13. The control method according to claim 9, further comprising:
identifying a display module corresponding to a display module which is replaced among the plurality of display modules; and
calibrating a gamma value of the replaced display module based on a gamma calibration table corresponding to the identified display module or applying the determined calibration coefficient to an image signal corresponding to the replaced display module.

14. The control method according to claim 9, wherein the reference calibration coefficient corresponding to one of the plurality of display modules comprises a reference calibration coefficient corresponding to each of a plurality of regions of the display divided into an area corresponding to a display module among the plurality of display modules.

15. The control method according to claim 14, wherein the calibrating the image signal comprises:
dividing the display region of the display into a plurality of first regions based on an area corresponding to one of the plurality of display modules;
determining a first calibration coefficient corresponding to each of the plurality of first regions based on a first reference calibration coefficient and a grayscale of each of the plurality of first regions; and
calibrating the image signal by applying the determined first calibration coefficient to the image signal.

16. The control method according to claim 15, wherein the calibrating the image signal comprises:
dividing the display region of the display into a plurality of second regions based on an area corresponding to another display module of the plurality of display modules;
determining a second calibration coefficient corresponding to each of the plurality of second regions based on a second reference calibration coefficient and a grayscale corresponding to each of the plurality of second regions; and
calibrating the image signal by applying the determined second calibration coefficient to an image signal to which the determined first calibration coefficient is applied.

* * * * *